Jan. 12, 1971 T. J. ULRICH 3,555,387
MOTOR DRIVE SYSTEM
Filed Feb. 21, 1968 2 Sheets-Sheet 1
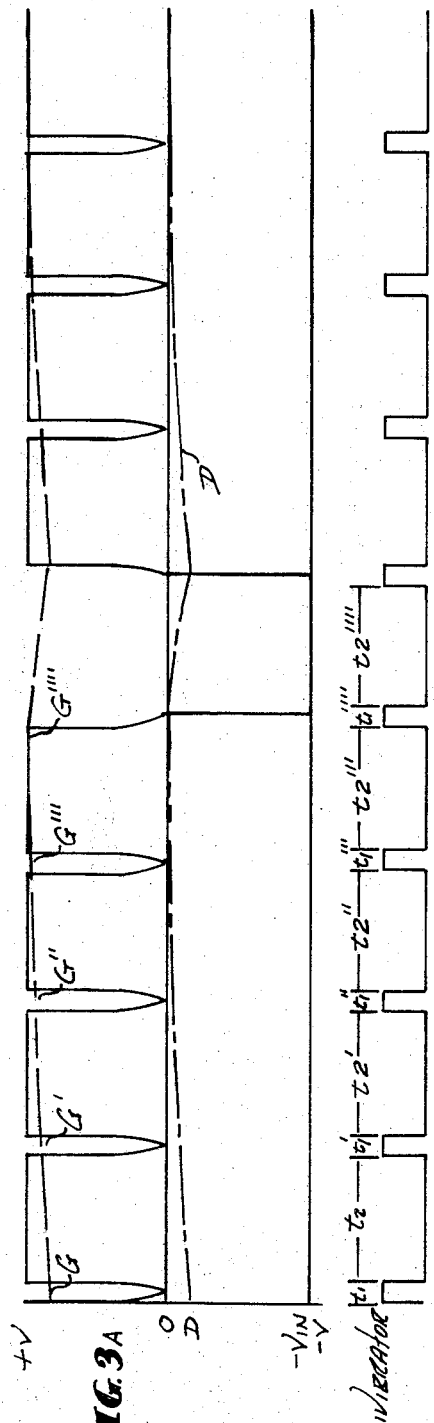
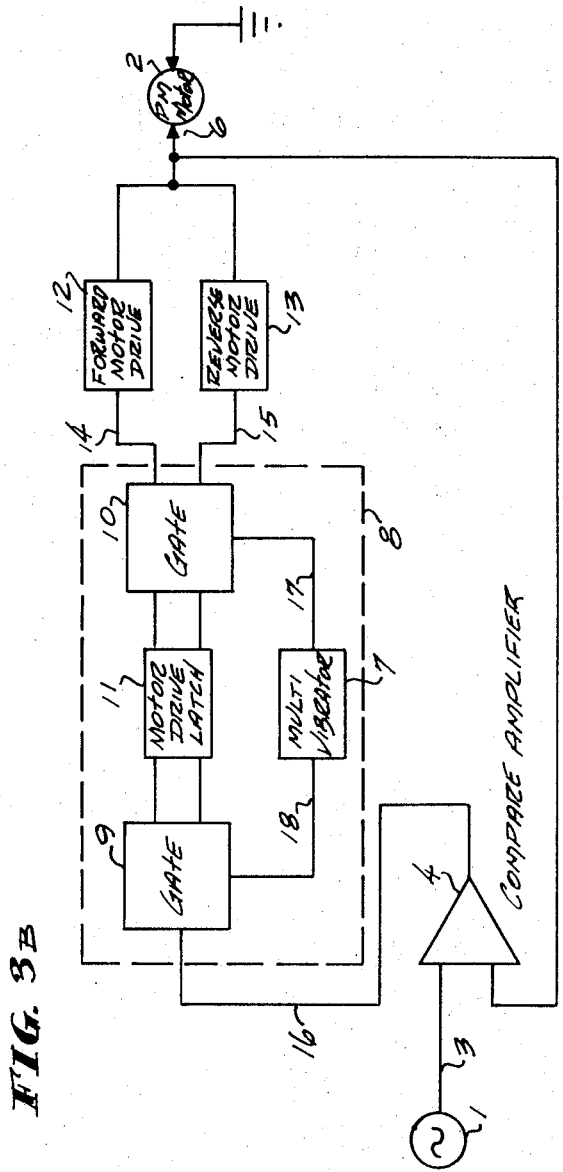
THOMAS J. ULRICH
INVENTOR.
BY John W. Young
ATTORNEY United States Patent Office 3,555,387
Patented Jan. 12, 1971

3,555,387
MOTOR DRIVE SYSTEM
Thomas J. Ulrich, Vestal, N.Y., assignor to National Electro-Mechanical Systems, Inc., Binghamton, N.Y., a corporation of New York
Filed Feb. 21, 1968, Ser. No. 707,048
Int. Cl. H02p 5/10
U.S. Cl. 318—331        1 Claim

ABSTRACT OF THE DISCLOSURE

A motor speed control system for a velocity type servomechanism including a forward drive network, a reverse drive network, a gating and latching network, a compare amplifier, a multivibrator, and a feedback network, wherein the generated voltage of the servomechanism is directly compared with the input voltage and the servomechanism is driven for a fixed time period with a constant voltage to correct for any sensed deviation.

---

This invention relates to a new and improved D.C. velocity servomechanism motor drive system, and, more particularly, to a motor drive system for a D.C. velocity servomechanism that provides smooth and accurate response over the full dynamic range of the servomechanism and, especially, at low or threshold voltage levels.

In the past, it has been necessary to provide modulation and regulation for velocity servomechanisms at low or threshold voltages in systems where accurate and uniform response is required, as the proper speed, and direction, of the output shaft of the velocity servomechanism was not accurately, or evenly, maintained at these levels.

Previously, complex electronic and/or mechanical or optical systems were used to provide an even and accurate response of the D.C. servomechanism over its full range. For example, optical-electrical devices were mounted on the output shaft of the motor and the deviation from the desired output velocity was dynamically sensed, optically. The deviation was then corrected or adjusted electronically. Systems such as this are not only expensive but also provided loads and stresses to the system that are not desirable.

The present system and invention utilizes a well known axiom of the art, in a novel way, to provide a new and improved motor drive system.

It is well known that a D.C. permanent magnet motor will generate a voltage which is directly proportional to the speed of the motor, when it is allowed to freely revolve. In the present invention the generated voltage of the motor is utilized to provide the regulation, the generated voltage being compared, periodically, with the input voltage to the servomechanism, and the difference signal between said levels utilized to drive the servomechanism.

In the preferred embodiment of the invention, the servomechanism utilizes a permanent magnet motor which is periodically "disconnected" from the drive system and, during this time, the compare mode, the generated voltage of the motor is compared, at a compare amplifier, with the input voltage to determine if the rate of speed of the output shaft is correct and accurate.

If a difference exists, either negatively or positively, the polarity indicating the direction of the difference, the difference signal is directed from the compare amplifier through a gating circuit, which is controlled by the timing system to drive the motor, during the drive cycle, in the necessary direction to correct the deviation.

As it was stated, the motor is periodically "disconnected" from the system and the generated voltage compared to the input, the frequency of comparison being determined in large by the various circuit parameters. However, it is pointed out that the compare mode is very short in relation to the overall cycle. The difference level is periodically sensed and the motor excited, periodically, to selectively increase or reduce the speed of the motor and to bring the input voltage and generated voltage to identical levels at the compare amplifier.

It is an object of this invention to provide a new and improved motor drive system for a D.C. servomechanism.

It is a further object of this invention to provide a motor drive system which will provide smooth and uniform response, even at critical threshold and low levels.

In the drawings:

FIG. 1 is a block diagram which illustrates basically the motor drive system.

Figure 2:
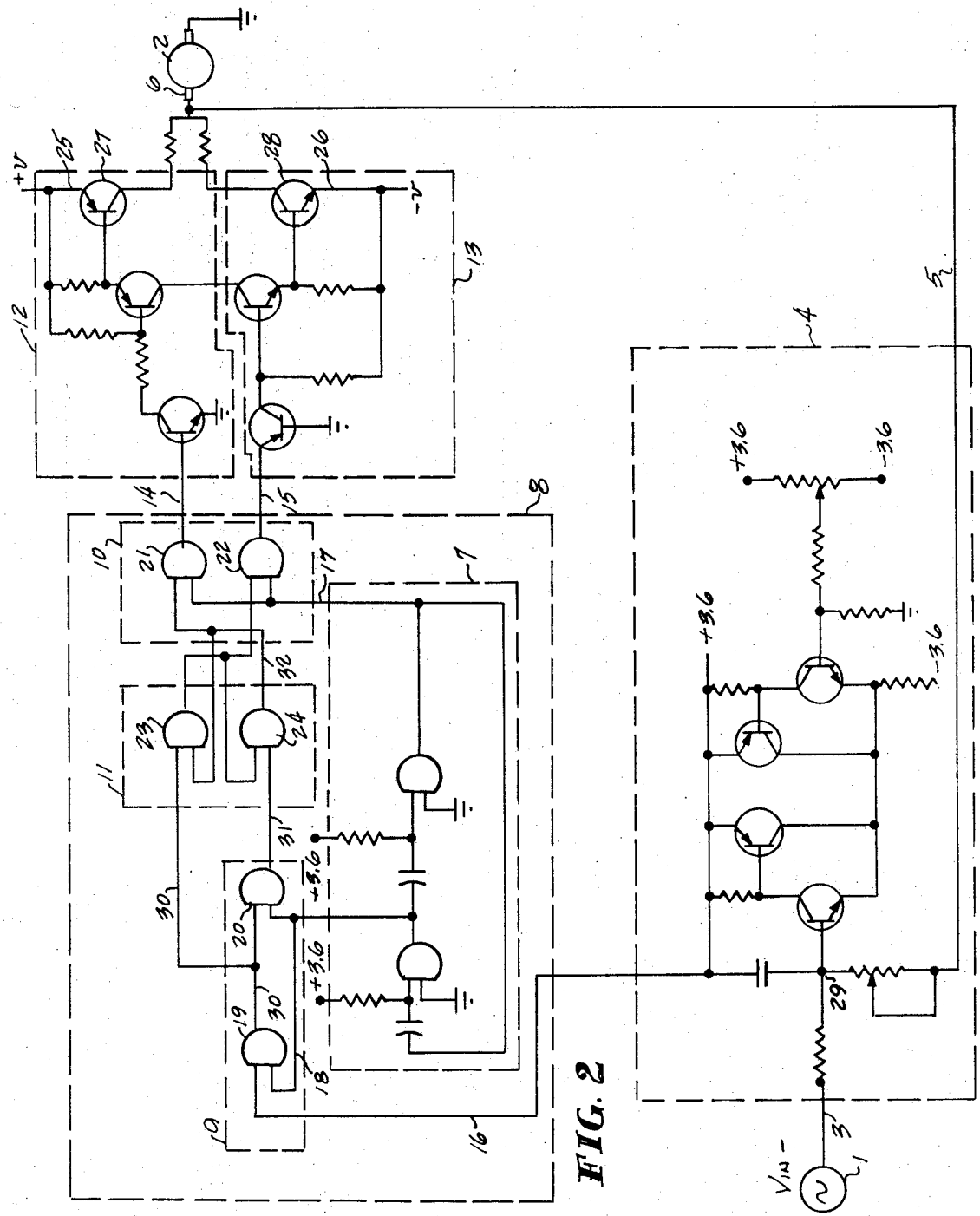
FIG. 2 is a schematic diagram of the preferred embodiment of the invention.

FIGS. 3A and B are timing diagrams which are shown to more clearly describe the invention.

Referring now to the drawings and, more particularly, to FIG. 1, wherein the preferred embodiment of the motor drive system for a D.C. velocity servomechanism is depicted in block form, the control voltage input 1 for the D.C. motor 2 is directed by input line 3 to a compare amplifier 4. Compare amplifier 4 is a typical D.C. differential summing amplifier, which is well known, an example of which is shown and illustrated at page 187 of Electronic Analog and Hybrid Computers by Granino A. Korns and Theresa M. Korn, published by McGraw Hill, 1964, the output of which represents the difference in magnitude between the input signals, although the polarity of the output is the inverse of the input signal.

The second input 5, or feedback input, to summing amplifier 4 is also connected to the D.C. motor input 6. D.C. motor 2 is periodically "disconnected" from the motor drive system through the synchronized operation of an asymmetrical multivibrator 7 and a gating and latch network 8.

Asymmetrical multivibrator 7 is a conventional and typical asymmetrical multivibrator, an example of which is shown and illustrated at page 439 of Pulse, Digital and Switching Wave Forms, by Jacob Millman and Herbert Taub, published by McGraw-Hill, 1965, and provides the timing synchronization for the motor drive system by the selective control of gates 9 and 10, as will be explained in detail hereinafter.

Gates 9 and 10, controlled by multivibrator 7, and operating in conjunction with a motor drive latch 11, selectively controls and energizes the forward motor drive circuit 12 and the reverse motor drive circuit 13, by selectively directing the proper signal to the motor drive circuits 12 and 13 by the input lines 14 and 15, to either increase or reduce, depending on the circuit conditions, the speed of motor 2.

For example, during the period that the speed of motor 2 is monitored to determine whether it is revolving at the proper speed, multivibrator or timer 7 sets gates 9 and 10 to effectively disconnect motor 2 from the circuit and to place gates 9 and 10 in a "compare" mode.

Permanent magnet motor 2 continues to revolve and the generated voltage of motor 2 at armature 6 is directed to compare amplifier 4 by input line 5 where it is compared with the control voltage input directed to compare amplifier 4 on input line 3.

The control voltage signal and the generated voltage are compared and the difference signal, either negative or positive, the polarity indicating the direction of the difference, is directed by output line 16 to gate 9.

The polarity of the different signal found on line 16 will selectively determine the gating and latching sequence of gates 9 and 10 and motor drive latch 11, which will, in turn, determine whether motor 2 will be excited by forward motor drive circuit 12 or reverse motor drive circuit 13. Thus, for example, assuming that the control input signal is negative and generated voltage is positive in nature, if the speed of motor 2 is lower than desired, when motor 2 is "disconnected" from the circuit, the magnitude of the control signal voltage will exceed the magnitude of the generated voltage of motor 2 and the output of compare amplifier 4 on line 16 will be positive, the difference signal being negative in nature, indicating that motor 2 should be driven and the speed increased.

This positive signal, on output line 16, is directed to gating and latch circuit 8 by output line 16, and a signal is directed from gating and latch circuit 8 on output line 14 to forward motor drive latch 12 whereby a positive signal is directed to motor 2 to drive the motor and increase its speed.

The timing sequence and detailed operation of the motor drive system can be more clearly understood by referring to FIG. 2 and FIGS. 3A and 3B.

Multivibrator 7 is typical asymmetrical multivibrator, which is well known in the art, an example of which is shown and illustrated at page 439 of Pulse, Digital and Switching Wave Forms, referred to hereinbefore, the output found on output line 17 of multivibrator 7 being represented by the wave form of FIG. 3B; the wave form of the signal found on output line 18 is, of course, wave form 3B inverted, and is not shown.

The output signals of multivibrator 7 are directed to gates 9 and 10 respectively by output lines 17 and 18.

Gates 9 and 10 are comprised of conventional AND gates, examples of which are shown at page 400 of "Electronic Analog and Hybrid Computers, referred to hereinbefore, 19, 20, 21, and 22, respectively, as shown in FIG. 2, each of said AND gates 19, 20, 21, and 22 requiring a negative input signal on each input line thereto to provide positive going output.

Gate 9 controls a motor drive latch 11, comprised of OR gates 23 and 24, which in turn controls gate 10. OR gates 23 and 24 are typical and conventional OR gates, examples of which are shown at page 400 of Electronic Analog and Hybrid Computers referred to hereinbefore wherein a positive signal on either input thereto will produce a negative going output.

Referring now to FIGS. 2, 3A and 3B, for a more complete understanding of the timing sequence and the motor drive system, the $+v$ and $-v$ levels, as shown in FIG. 3A, represent the driving voltages $+v$ and $-v$ connected to the emitters 25 and 26 of the power transistors 27 and 28, respectively, of forward motor drive circuit 12 and reverse motor drive circuit 13; $-v_{in}$ represents the input signal from source 1 and $+G$ represents the generated voltage of motor 2; $t_1$ of wave form 3B represents the time interval in which the generated voltage $+G$ is compared with the input voltage $-v_{in}$, the "compare mode"; $t_2$ represents the time interval in which motor 2 is driven by voltage sources $+v$ and $-v$, the drive mode or cycle; and D represents the difference signal between input voltage $-v_{in}$ and generated voltage $+G$.

At the commencement of time $t_1$ output line 17 of multivibrator 7 provides a positive going signal to AND gates 21 and 22 of gate 10 inhibiting AND gates 21 and 22, and effectively disconnecting permanent magnet motor 2 from the circuit, as forward motor drive circuit 12 and reverse motor drive circuit 13 are rendered quiescent by the negative going signals on output lines 14 and 15 of AND gates 21 and 22, respectively.

At the same time, the commencement of time interval $t_1$, output line 18 of multivibrator 7 goes negative, the wave form thereon being the inversion of wave form 3B on line 17, and the negative going signal is directed to AND gates 19 and 20, setting gate 9 for the compare mode. The generated voltage $+G$ and the input voltage $-v_{in}$ are then compared at a summing point 29 of compare amplifier 4, which is a conventional differential summing amplifier. FIG. 3A illustrates a typical example wherein the voltage input $-v_{in}$ exceeds in magnitude the generated voltage $+G$ of motor 2, i.e., the motor speed being slightly lower than the desired motor speed.

The output on line 16 when the input voltage, $-v_{in}$, exceeds and is greater in magnitude than the generated voltage, $+G$, will be a positive level, compare amplifier 4 inverting the negative difference signal D. This positive going signal is directed to AND gate 19, inhibiting AND gate 19 and providing a negative going signal on output line 30 thereof which, in turn, is directed to OR gate 23. The negative signal on line 30 is also directed to AND gate 20, energizing AND gate 20 as input line 18 thereto is also negative during this period of the cycle, the compare mode.

AND gate 20 provides a positive going signal on output on line 31 to OR gate 24, which conducts and directs a negative signal an output on line 32 to OR gate 23, inhibiting and latching OR gate 23. A similar latching circuit is shown and described on page 367 of Pulse, Digital and Switching wave forms, referred to hereinbefore.

The negative going output from OR gate 24 is also directed to AND gate 21, which is inhibited by the presence of the positive going signal on input line 17 thereto, during this period of the cycle.

At the termination of the compare mode, the end of time interval $t_1$, multivabrator 7, changes state and the output of asymmetrical multivibrator 7 on line 17 goes negative, the output on line 18 going positive, resetting gates 19 and 20. OR gates 23 and 24 remain latched due to the latching action described hereinbefore, and the negative going signal on output line 32 continues to be applied to AND gate 21.

At the commencement of drive interval $t_2$ line 17 goes negative and AND gate 21 of gate 10 conducts, directing a positive going signal on output line 14 to the forward drive motor circuit 12, which, in turn, directs voltage $+v$ through transistor 27 to permanent magnet motor 2. Voltage $+v$ is applied continually to motor 2 during the drive cycle or interval $t_2$, causing permanent magnet motor 2 to be driven at a higher speed, and, at end of the drive cycle the increased speed is reflected by an increase in the generated voltage $+G$.

The cycle repeats itself when multivibrator 7 again changes its state, the compare mode being re-initiated and repeated, motor 2 being again "disconnected" from the circuit and monitored.

During time intervals $t_1'$, $t_1''$, and $t_1'''$, the difference voltage D at summing point 29 remains negative, although diminished, and the same sequence is repeated, drive voltage $+v$ being applied to motor 2 in drive periods $t_2'$, $t_2''$ and $t_2'''$ to increase the speed of motor 2 and bring generated voltage $+G$ up to the level of input voltage $-v_{in}$.

At the time, $t_1''''$, the generated voltage $+G''''$ exceeds, or is greater in magnitude than $-v_{in}$, difference signal D now being positive, and it then becomes necessary to reverse the direction of the correction and impede or slow down motor 2, as it is revolving faster than desired. As it was pointed out previously at any time the difference signal is negative, then the output of compare amplifier 4 is positive, and, correspondingly, any time the difference voltage D is positive then the output of compare amplifier 4 will be negative.

At time $t_1''''$, input voltage $-v_{in}$ becomes less than the generated voltage $G''''$, the difference voltage becoming positive, and, therefore, output line 16 of compare amplifier 4 goes negative. The negative going signal on line 16 energizes AND gate 19, input line 18 thereto being negative also, applying a positive going pulse to OR gate 23 and AND gate 20, which is inhibited by the positive going signal on line 30.

OR gate 23 conducts and applies a negative going signal to OR gate 24, latching OR gates 23 and 24. The negative going signal from OR gate 23 is also directed to AND gate 22. At the commencement of drive cycle $t_2''''$, reverse motor drive circuit 13 is energized by the positive going signal on output line 15, causing the voltage level $-v$ at emitter 26 of transistor 28 to be applied to motor 2, impeding the motor 2, reducing the speed and generated voltage G thereof to bring the same into conformity with input voltage $-v_{in}$.

It is obvious that many departures and changes may be made and incorporated in the preferred embodiment of the present invention without departing from the scope of the invention. The motor drive system of the present invention provides modulation and regulation to the servomechanism over its full dynamic range, without the addition of load or stress to the mechanical system.

It will thus be seen that the objects set forth above, among those made apparent from the preceding description, are efficiently attained, and since certain changes may be made in the above apparatus without departing from the scope of the invention, it is intended that all matters contained or shown in the accompanying drawings shall be interpreted as illustrative and not in a limiting sense.

I claim:

1. A motor speed control system for a D.C. velocity servomechanism, including a permanent magnet motor, consisting of
   (a) a first source of D.C. voltage for energizing said motor;
   (b) a forward motor drive network, including a constant amplitude D.C. voltage source, for driving said motor in a first direction;
   (c) a reverse motor drive network, including a constant amplitude D.C. voltage source of opposite polarity from said D.C. voltage source of said forward motor drive network, for driving said motor in the opposite direction;
   (d) a comparison means, consisting of a summing amplifier having first and second input terminals,
      (1) said first input terminal being connected with said first source of D.C. voltage;
   (e) feedback means directly connecting said motor to said second input terminal of said comparison means, wherein the signal from said first source of voltage is directly compared with the generated voltage of said motor to develop a deviation voltage signal, the polarity of said deviation signal being indicative of the direction and speed of said motor from the desired direction and speed of said motor;
   (f) Gating and latching means, having an input gating and latching circuit responsive to said deviation signal and first and second output means connected respectively to said forward motor drive network and said reverse drive network for selectively energizing either said forward motor drive network or said reverse drive network depending on the polarity of said deviation signal;
      (1) said gating and latching means further including an asymmetrical multivibrator having first and second output channels, said first output channel being connected to said first and second output means of said gating and latching means and said second channel being connected to said input gating and latching circuit, the output pulse of said multivibrator being a non-symmetrical square wave of fixed duration, whereby said first or second output means is selectively energized by said input gating and latching means and said multivibrator depending on the polarity of said deviation signal to selectively energize said forward drive network or reverse drive network to apply said constant amplitude voltage source of either said forward or reverse motor drive network to said motor for a predetermined fixed interval to drive said motor in the direction necessary to compensate said deviation.

References Cited

UNITED STATES PATENTS 3,414,791   12/1968   Munson et al.    318—331
3,436,636   4/1969   James    318—331

ORIS L. RADER, Primary Examiner

W. E. DUNCANSON, JR., Assistant Examiner

U.S. Cl. X.R.

318—302